(No Model.) 5 Sheets—Sheet 1.
L. A. FEHR.
ELECTRICAL SWITCHBOARD.

No. 474,632. Patented May 10, 1892.

Witnesses
W. H. Courtland
N. L. Hugues

Inventor
Louis Albert Fehr
by A. P. Smith
his Atty.

(No Model.) 5 Sheets—Sheet 2.

L. A. FEHR.
ELECTRICAL SWITCHBOARD.

No. 474,632. Patented May 10, 1892.

Witnesses
W. H. Courtland

Inventor:—
Louis Albert Fehr
by A. P. Smith
his Atty.

(No Model.)  5 Sheets—Sheet 3.
L. A. FEHR.
ELECTRICAL SWITCHBOARD.
No. 474,632. Patented May 10, 1892.
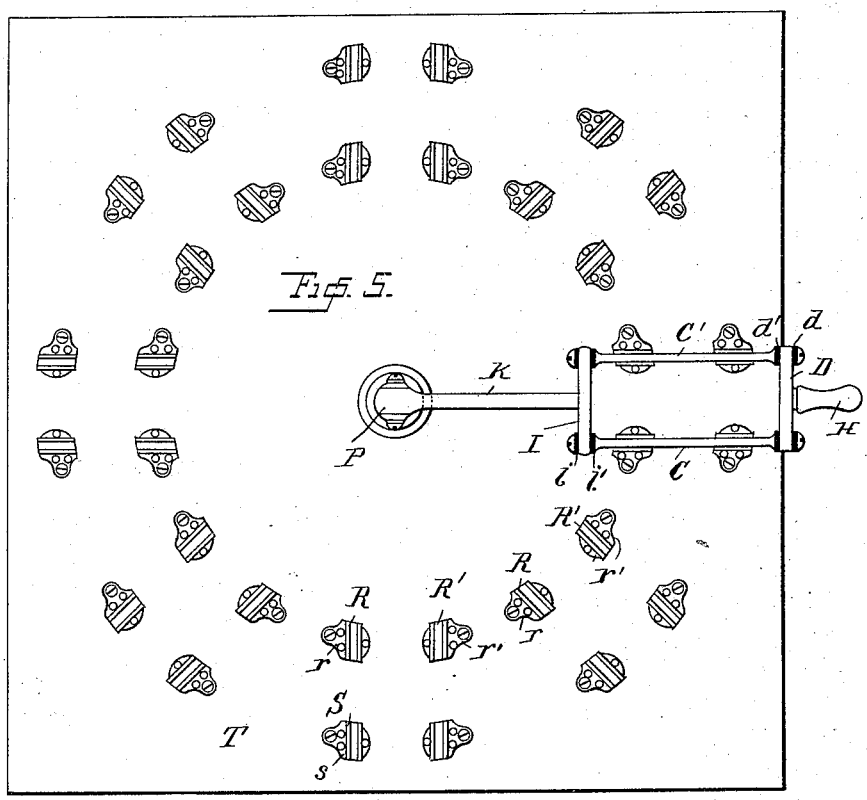
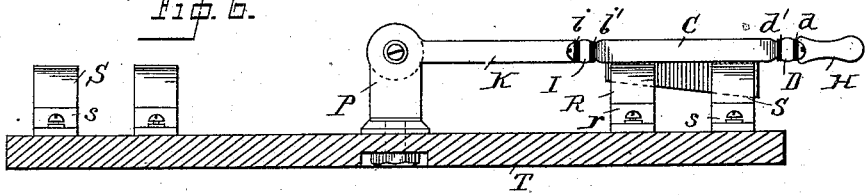
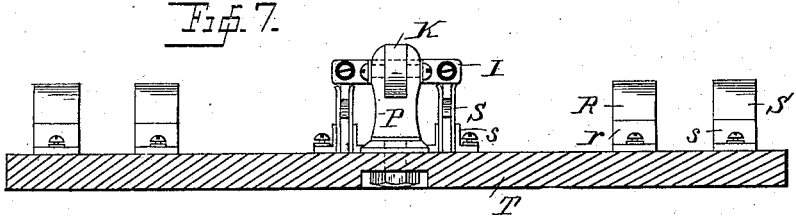
Witnesses  Inventor:—

(No Model.) 5 Sheets—Sheet 4.
L. A. FEHR.
ELECTRICAL SWITCHBOARD.
No. 474,632. Patented May 10, 1892.
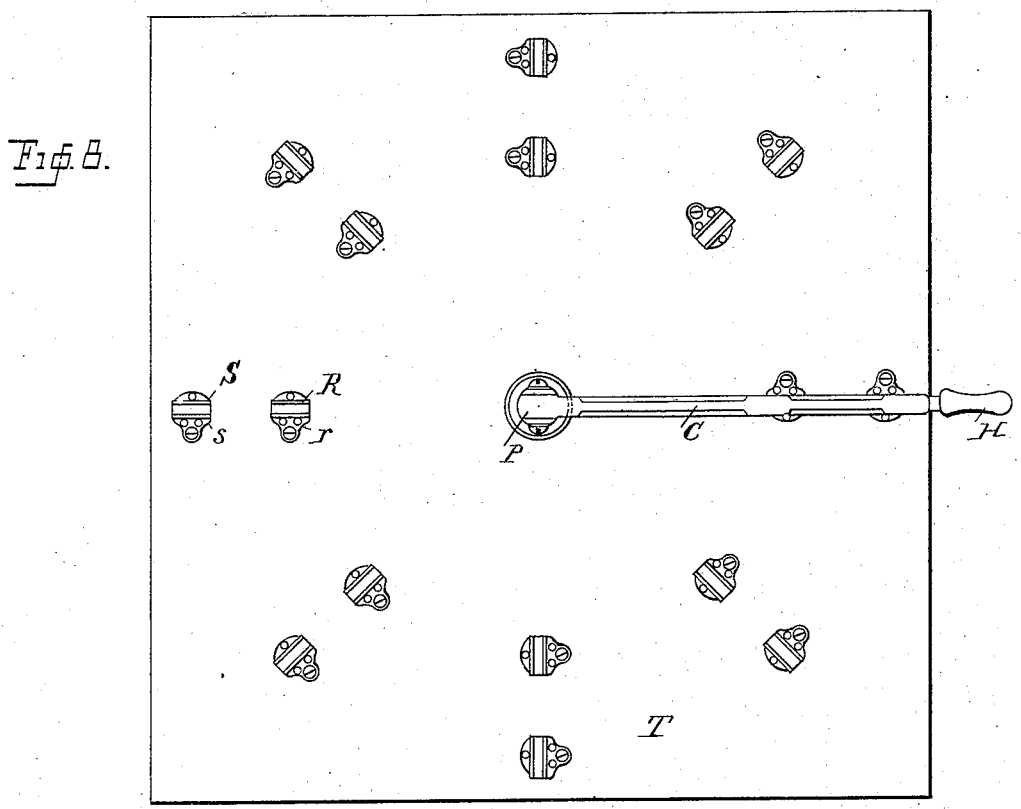
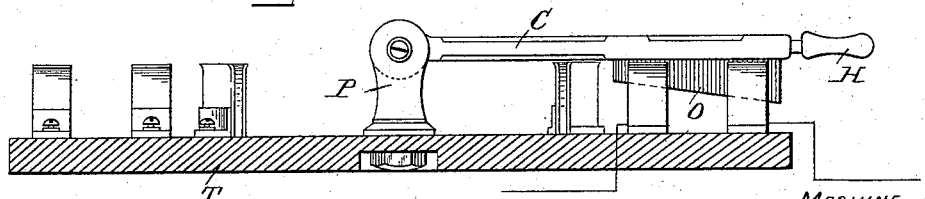
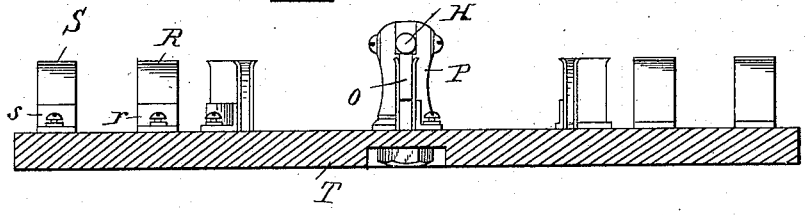
Witnesses:—
W. A. Courtland
N. L. Hughes
Inventor:—
Louis Albert Fehr
by H. P. Smith
his Atty.

(No Model.)  5 Sheets—Sheet 5.

L. A. FEHR.
ELECTRICAL SWITCHBOARD.

No. 474,632.  Patented May 10, 1892.

Witnesses
W. H. Courtland
H. L. Duques

Inventor:-
Louis Albert Fehr
by A. P. Smith
his Atty.

UNITED STATES PATENT OFFICE.

LOUIS A. FEHR, OF NEW YORK, N. Y.

ELECTRICAL SWITCHBOARD.

SPECIFICATION forming part of Letters Patent No. 474,632, dated May 10, 1892.

Application filed November 28, 1890. Serial No. 372,957. (No model.)

*To all whom it may concern:*

Be it known that I, LOUIS ALBERT FEHR, a citizen of the United States, residing at New York, in the county of New York and State of New York, have invented certain new and useful Improvements in Electrical Switchboards; and I do hereby declare the following to be a full, clear, and exact description of the invention, such as will enable others skilled in the art to which it appertains to make and use the same.

My invention consists of the improved form of electrical switch and arrangement of circuits for use in central stations where there are a number of dynamos or other sources of electrical supply and a number of different work-circuits.

Figure 1:
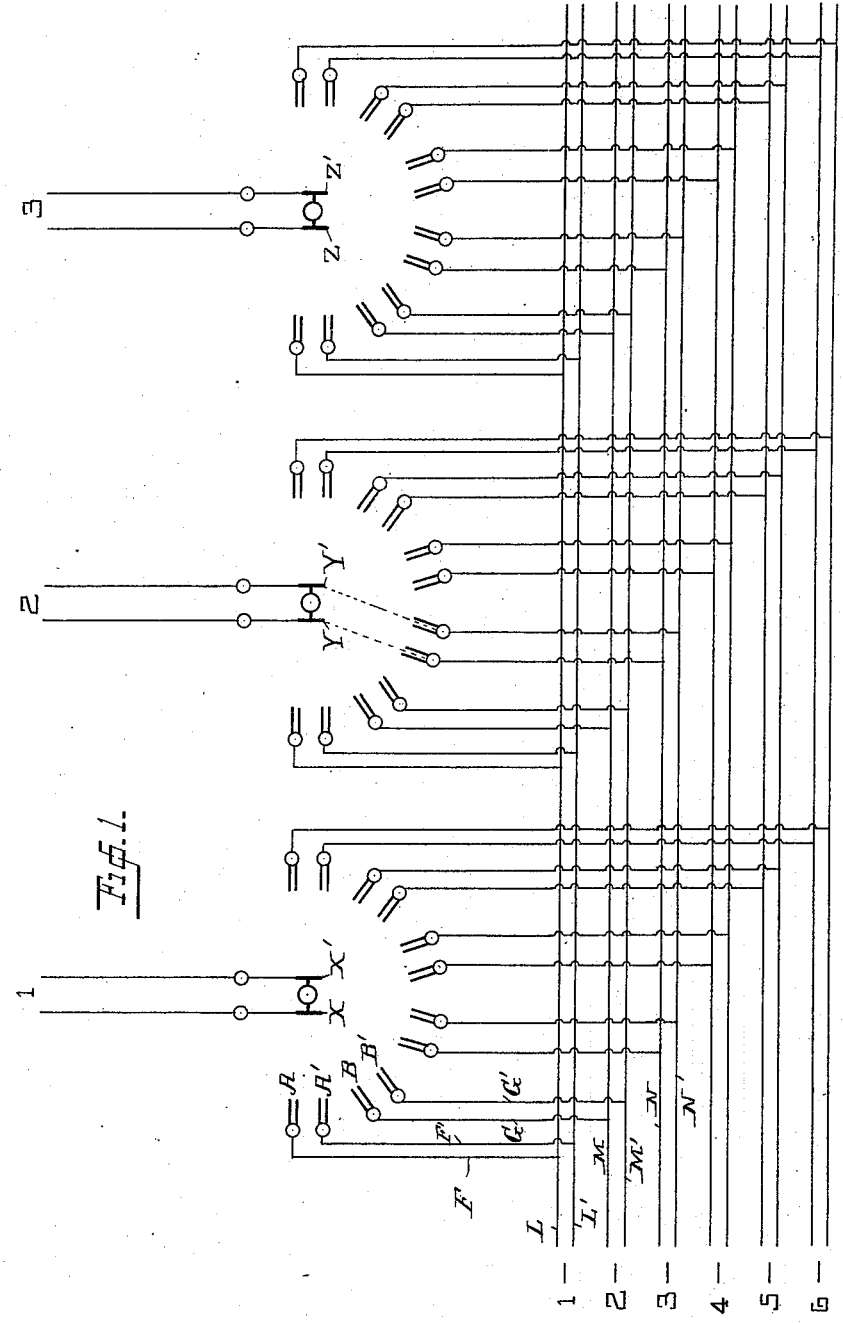
Figure 2:
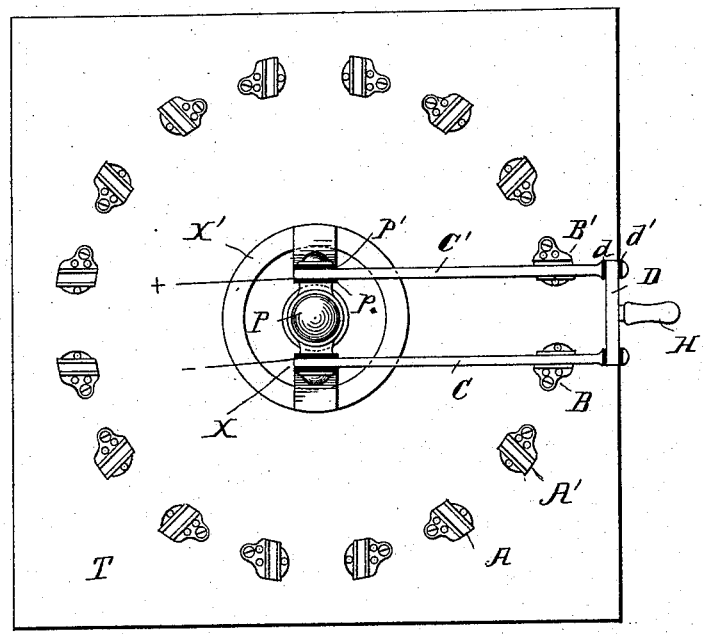
Figure 11:
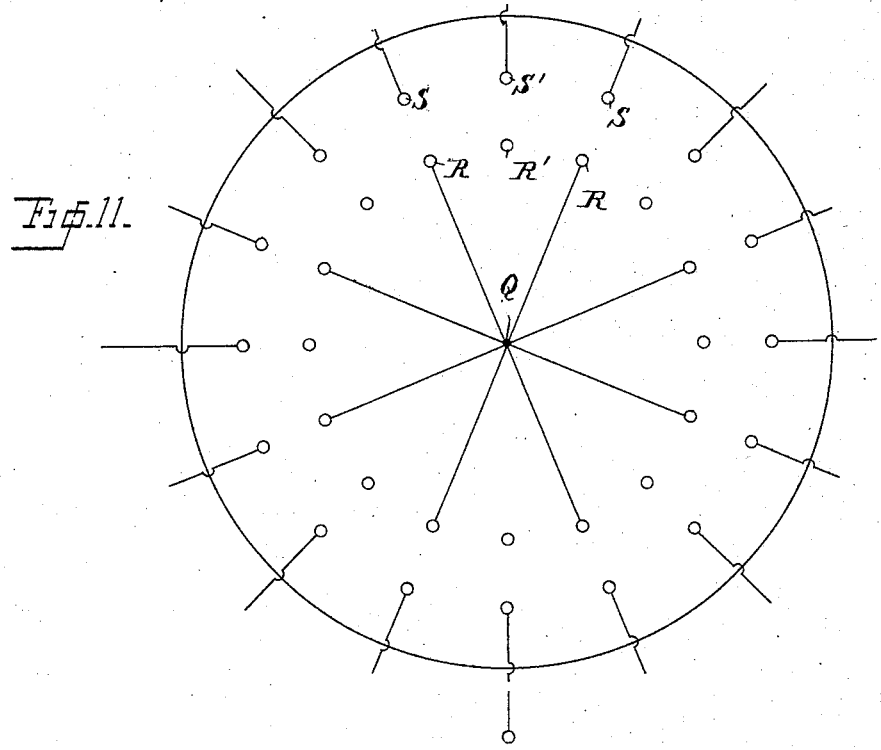
Figure 12:
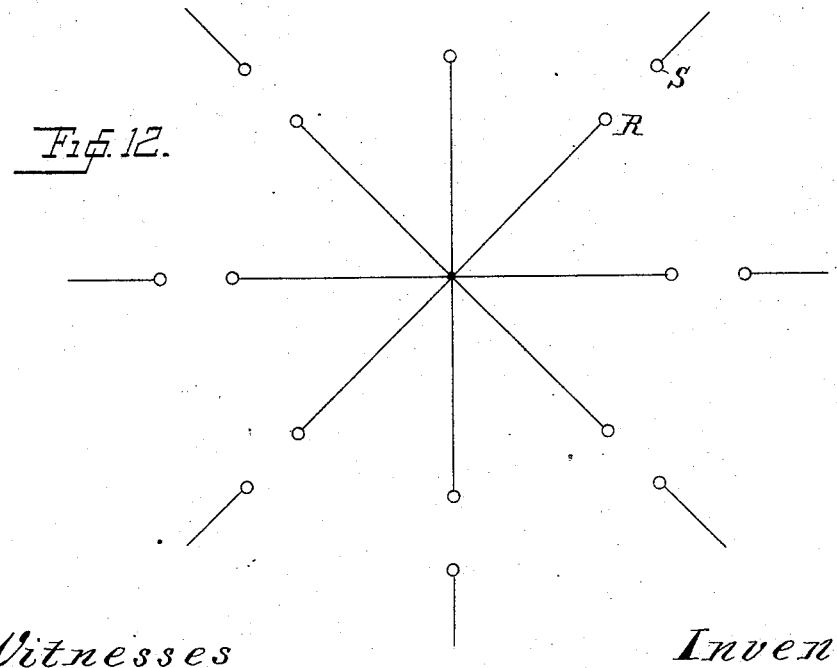

In the drawings, Figure 1 is a diagram of the wiring of such a station. Fig. 2 is a plan view, and Figs. 3 and 4 sectional views, of one form of switch. Fig. 5 is a plan view, and Figs. 6 and 7 sectional views, of a modified form of switch. Fig. 8 is a plan view, and Figs. 9 and 10 sectional views, of a second modification. Fig. 11 is a partial diagram of the wiring of the form of the switch shown in Fig. 5. Fig. 12 is a diagram of the wiring of the form of switch shown in Fig. 8.

It frequently happens in large central stations for electrical lighting and the distribution of electrical power that there are a number of dynamos run intermittently, being shunted in and out as economy and convenience may require, and a number of different work-circuits supplied from said stations. It is necessary that the connections in said station be such that any one or more work-circuits may be singly or simultaneously thrown onto any one machine. At the same time it is desirable that the connections be such that by no possibility, neither through ignorance or carelessness, shall two machines be thrown onto one work-circuit at the same time, as the result of such connection is apt to be the ruin of the machines or of the translating devices in the work-circuit. To secure an arrangement which shall answer these requirements I have designed the system of connections and switches herein to be described and illustrated, in which the terminals of the various work-circuits are represented by X X' Y Y' Z Z', Fig. 1, and L L' M M' N N' are the feeders running from the several machines or the other sources of electrical supply numbered 1, 2, 3, 4, 5, and 6.

As represented in Fig. 1, each work-circuit terminates in a pivoted switch which is connected in any proper way to the terminals of the work-circuit, and has a series of contacts within the circle of revolution, which contacts are connected to the feeders L L' M M', &c. by wires F F' G G', &c. It will be evident from an inspection of the diagram that any one or more of the work-circuits X X' Y Y' Z Z', &c., can be thrown upon any one of the supply-circuits leading from the machines 1 2 3, &c.; but that by no possibility can two machines be crossed on the same work-circuit. A variety of forms of switches may be used with this arrangement of wiring, and where it is desired one-half the amount of wiring shown in Fig. 1 may be dispensed with and a ground-circuit used for the return instead of an all-metallic circuit.

Figure 3:
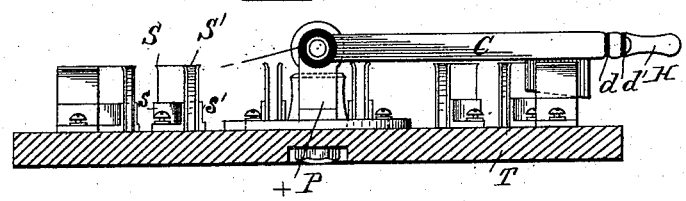
Figure 4:
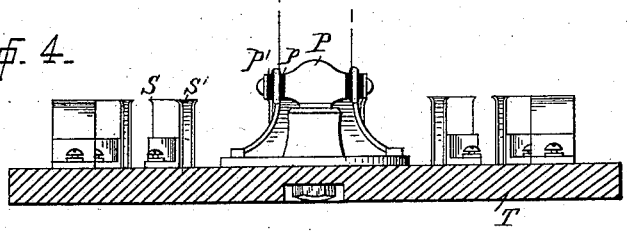

The form of a switch illustrated in Figs. 2, 3, and 4 consists of the base-plate T, of non-conducting material, and the two bars C C', hinged to the pivot P. The cross-bar D connects C with C' mechanically; but said bars are insulated one from another electrically by the pieces of insulation $p$ $p'$ and $d$ $d'$. The handle H affords a convenient means of raising, lowering, and swinging the pivoted switch, so that the bars C C' may be dropped upon any pair of contact-pieces A A' B B', &c., which are connected with the terminals of the different supply-circuits, as shown in Fig. 1, each of said contact-pieces being connected with only one terminal. The spring-pieces S S' insure a good contact with the switch-bars. They are supported by the little angle-pieces $s$ $s'$.

The method of connecting the work-circuit to the pivoted switch may vary. I have illustrated several ways. In Figs. 1 and 2 the terminals X X' are connected permanently to the bars C C' by direct wiring or in any convenient manner. In Figs. 5, 6, and 7 the bars C C' are shortened up, and are mechanically connected to the pivot P by the bar K and cross-bar I, while they are electrically separated from the same by the insulation $i$ $i'$.

A second set of pairs of contact-pieces R R' are put in so that the switch-bars C C' may connect any set of contacts S S' with its corresponding set R R'. The corresponding members of the inner circle of pairs, as R R, are connected together at Q, Fig. 11, and to one terminal—say the positive terminal—of the work-circuit controlled by that switch. The other members R R' of the pairs of contacts would be similarly connected together and to the other terminal of the work-circuit. (This connection is not shown.) The outer circle of contacts are of course connected to the various work-circuits, the same as in Fig. 1. It is evident that the dropping of the switch-bar upon any set of four contacts, as shown in Fig. 5, will throw the work-circuit corresponding to that switch into connection with one or another of the supply-circuits, and that the crossing of two machines is also impossible here.

A third arrangement embodying the principle of my invention when a ground return-circuit is used is shown in Figs. 8, 9, 10, and 12. In this case there may be second series of contacts R for connecting the switch to its work in circuit, as shown in Fig. 8, or the connection might be direct, as in Fig. 2. There is in this case only one switch-bar C, however, and by dropping this or its projecting blade O between the springs of any contact-piece S the connection is complete from the source of supply through the switch-bar to the work-circuit and back through the earth.

Fig. 12 is a diagram showing the wiring of the form of switch illustrated in Fig. 8. r are small angle-piece supporting-contacts R.

The method of operation of my invention is clear from the foregoing description.

The advantages are the compactness of construction, convenience of use, and the securing of safety against the possibility of crossing two machines or throwing of a double current on one work-circuit.

Having therefore described my invention, what I claim as new, and desire to protect by Letters Patent, is—

1. The combination of a plurality of sources of electrical supply, a plurality of work-circuits, a pivoted switch connected to each work-circuit, and two sets of contact-pieces for each switch, one set of which contact-pieces are connected each to a terminal of a supply-circuit, the other set of contact-pieces being connected each to a terminal of a work-circuit, no contact-piece being connected with more than one such terminal, substantially as described.

2. The combination of a plurality of sources of electrical supply, a plurality of work-circuits, pivoted switches consisting of two bars insulated one from the other, but rigidly connected together, there being one such switch for each work-circuit, the two bars being connected to the terminals thereof, and a series of pairs of contact-pieces for each switch, each pair being connected to the terminals of a supply-circuit, no pair of contact-pieces being connected to more than one supply-circuit, substantially as described.

In testimony whereof I affix my signature in presence of two witnesses.

LOUIS A. FEHR.

Witnesses:
WARREN W. FOSTER,
HERBERT L. LUQUES.